(12) United States Patent
Zazula

(10) Patent No.: US 9,007,204 B2
(45) Date of Patent: Apr. 14, 2015

(54) AUTOMATIC IDENTIFICATION AND STORAGE OF FREQUENTLY VISITED LOCATIONS

(71) Applicant: Apple Inc., Cupertino, CA (US)

(72) Inventor: Ralph Zazula, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/251,292

(22) Filed: Apr. 11, 2014

(65) Prior Publication Data
US 2014/0221021 A1    Aug. 7, 2014

Related U.S. Application Data

(63) Continuation of application No. 13/156,277, filed on Jun. 8, 2011, now Pat. No. 8,736,442.

(51) Int. Cl.
| | |
|---|---|
| G08B 1/08 | (2006.01) |
| H04W 4/02 | (2009.01) |
| G06Q 10/10 | (2012.01) |
| G06Q 30/02 | (2012.01) |
| G06Q 50/28 | (2012.01) |
| G06Q 30/06 | (2012.01) |
| H04L 1/00 | (2006.01) |

(52) U.S. Cl.
CPC ............. *H04W 4/028* (2013.01); *G06Q 10/109* (2013.01); *G06Q 30/0201* (2013.01); *G06Q 50/28* (2013.01); *G06Q 10/10* (2013.01); *G06Q 30/02* (2013.01); *G06Q 30/06* (2013.01); *H04L 1/00* (2013.01)

(58) Field of Classification Search
USPC ................. 340/539.13; 705/14.66; 342/357.1
IPC ................................ H04W 64/00,4/028, 4/023
See application file for complete search history.

(56) References Cited

U.S. PATENT DOCUMENTS

| | | | |
|---|---|---|---|
| 8,736,442 B2 | 5/2014 | Zazula | |
| 2007/0161380 A1* | 7/2007 | Fok et al. | 455/456.1 |
| 2010/0004997 A1* | 1/2010 | Mehta et al. | 705/14.66 |
| 2010/0287178 A1 | 11/2010 | Lambert et al. | |
| 2011/0051665 A1 | 3/2011 | Huang | |

OTHER PUBLICATIONS

Kenneth Leftin, "See your location history dashboard and more with Google Maps 5.3 for Android," Google Mobile Blog (Apr. 4, 2011), available at http://googlemobile.blogspot.com/2011/04/see-your-location-history-dashbo- ard-and.html (last visited Jun. 8, 2011), 10 pages.

(Continued)

*Primary Examiner* — Shirley Lu
(74) *Attorney, Agent, or Firm* — Kilpatrick Townsend & Stockton LLP

(57) ABSTRACT

Disclosed herein are systems, methods, and non-transitory computer-readable storage media for automatically generating and updating a list of previously visited locations that are popular to a user. A data point can be generated from sampling a position of an electronic device. It can be determined if the data point represents a destination of the electronic device based upon metadata of the data point. An entry of a list of previously visited locations can be updated based upon the data point when a first previously visited location is within a distance threshold of the position of the data point.

20 Claims, 9 Drawing Sheets

(56) References Cited

OTHER PUBLICATIONS

Andrei Papliatseyeu, Oscar Mayora-Ibarra, "Mobile Habits: Inferring and predicting user activities with a location-aware smartphone," Proceedings of UCAMI 2008, Salamanca, Spain, Nov. 2008, p. 343-352, available at http://popleteev.com/static/pdf/2008.sub.--UCAml-2008.pdf (last visited Jun. 8, 2011), 10 pages.

Changqing Zhou, Nupur Bhatnagar, Shashi Shekhar, Loren Terveen, "Mining Personally Important Places from GPS Tracks," Proceedings of ICDE Workshops 2007, p. 517-526, available at http://www-users.cs.umn.edu/.about.czhou/pub/place-important.sub.--v3.pdf (last visited Jun. 8, 2011), 10 pages.

Notice of Allowance for U.S. Appl. No. 13/156,277, mailed Jan. 17, 2014, 14 pages.

* cited by examiner

AUTOMATIC IDENTIFICATION AND STORAGE OF FREQUENTLY VISITED LOCATIONS

CROSS-REFERENCES TO RELATED APPLICATIONS

This application is a continuation of U.S. patent application Ser. No. 13/156,277, filed Jun. 8, 2011, which is hereby incorporated by reference in its entirety for all purposes.

BACKGROUND

1. Technical Field

The present disclosure relates generally to location-based services and more specifically to automatically identifying frequently visited locations of a location-aware device. Location-aware devices may be mobile phones, portable Global Positioning System (GPS) units, and other devices capable of determining the geographic location of a user.

2. Introduction

Today, people take on more professional and personal responsibilities than ever before. This leads to some tasks not being completed due to insufficient time, poor planning or lapse in memory. Computerized personal organizers have become an increasingly popular mechanism to remind people of tasks that need to be completed. By placing upcoming or recurring tasks in a to-do list, the user can quickly review tasks for the upcoming hour, day, or week. Sometimes, the order that the tasks should be completed is also specified. For example, a person may enter a reminder into a personal organizer that milk needs to be picked up at the supermarket and that dry cleaning needs to be picked up at the dry cleaners. The person may even specify that for efficiency purposes, the dry cleaning should be picked up before the milk. These reminders may be placed in a sorted to-do list to ensure that tasks are completed in an efficient manner. Currently, computerized personal organizers are present in mobile devices, personal digital assistants (PDAs), media players, email devices, and others.

One limitation of conventional computerized personal organizers is that the personal organizer does not alert the user when it would be practical, convenient, or efficient for the user to perform a specific task. For example, the user above who sets a reminder to pick up the dry cleaning would not be reminded by the personal organizer to perform the task even though the user has just driven by the dry cleaners. The user is only reminded by the personal organizer to perform the task if the user manually reviews the to-do list or sets an alert at a specified date and time that he or she needs to go pick up the dry cleaning However, neither of these reminders provides dynamic alerts to the user based upon the current position of the user.

Another limitation of conventional computerized personal organizers is that the personal organizer does not have a convenient way of associating a physical address with a task to be performed. In the example above, a user has entered a specific task into the personal organizer such as, "Pick up dry cleaning at Sandy's Cleaners." However, a geographic location has not been associated with the task and therefore, driving directions to the location where the task is to be performed is not readily available. A user may search for the physical address of "Sandy's Cleaners" on the Internet or other address look up service and subsequently enter the address into a navigation program of the personal organizer or a GPS navigation unit for directions to the dry cleaners. However, this procedure is rather cumbersome. Alternatively, the user may bookmark (i.e., save in memory) the names and physical addresses of the locations of commonly performed tasks and subsequently associate specified tasks with one of the bookmarked locations. However, this procedure is time consuming and requires the user to be aware of all the locations he or she frequents most often.

Thus, a solution for an improved to-do list (i.e., task manager) without the limitations of conventional techniques is desired.

BRIEF SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and non-transitory computer-readable storage media for automatically generating and updating a list of previously visited locations that are popular to a user. The method includes receiving a data point belonging to a series of data points generated from periodically sampling a position of the electronic device, each of the series of data points including metadata describing the position and velocity of the electronic device at a particular point in time, automatically determining that the data point represents a destination of the electronic device based upon the metadata of the data point, and automatically updating a visited locations list based upon the data point, the visited locations list including an entry associated with a previously visited location of the electronic device, wherein the data point is combined with the entry when the position associated with the data point and the previously visited location are correlated. In some examples, the method may further include automatically generating a text string describing a point of interest located at the previously visited location and outputting the text string to the electronic device for visual presentation.

A system configured to automatically identify previously visited locations can include a processor, a memory configured to store a visited locations list, the visited locations list being a fixed, sorted list having a plurality of entries, wherein each entry is associated with a previously visited location of a portable device, a heuristic engine configured to periodically sample a position of the portable device at a predetermined interval according to steps comprising: receiving a data point associated with the position of the portable device, the data point including metadata describing the geographic position of the portable device at a point in time and determining whether the data point is a destination based upon the metadata, a location analyzer configured to update the visited locations list based upon the data point when the data point is the destination, and a module configured to request a plurality of text strings describing a point of interest located at each of the plurality of entries by transmitting a plurality of previously visited locations associated with the plurality of entries to a reverse geocoding service, to receive the plurality of text strings, and to output the plurality of text strings to the portable device for visual presentation.

A computer-implemented method for generating an alert to perform a task can include receiving a user-defined action to be performed at a future time, displaying a visited locations list including locations previously visited by a user. The visited locations list can be generated according to steps comprising periodically receiving a data point including a geometric position, accuracy, and velocity associated with a position of a location-aware device, evaluating the data point based upon the geometric position, velocity, and accuracy to determine whether the position represents a transient passage or a destination, and updating the visited locations list based upon the data point when the position represents a destination. The computer implemented method can further include receiving a user-selected location from the visited locations list, generating the task based upon the user-defined action and the user-selected location, and generating the alert to perform the task when the location-aware device is within a predefined distance from a geographic location associated with the user-selected location.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Figure 1:
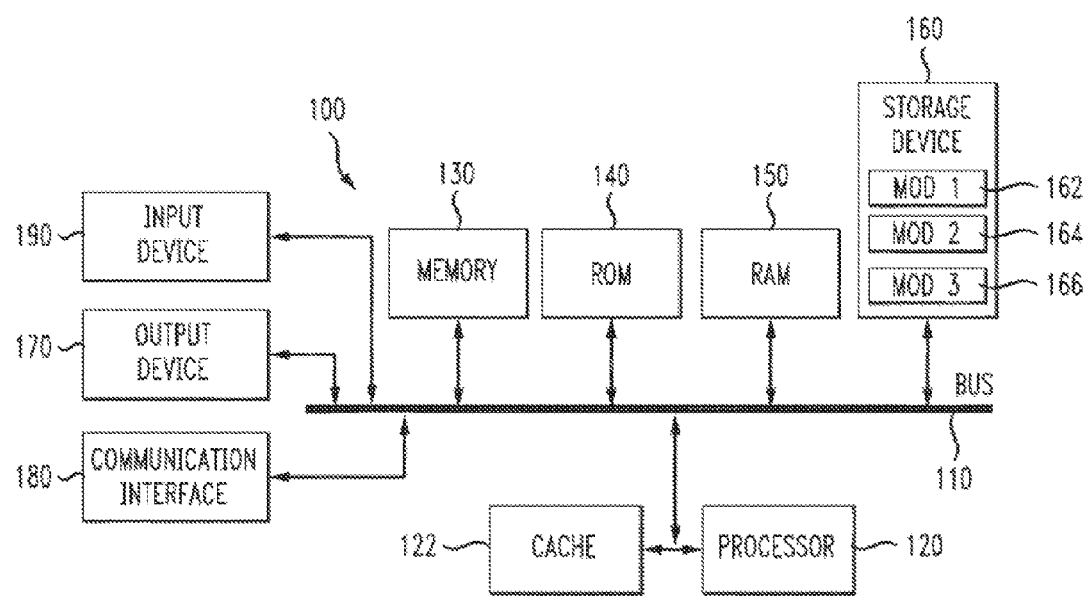
FIG. 1 illustrates an exemplary system embodiment.

The present disclosure addresses the need in the art for automatically identifying a list of popular locations related to a particular user. The geographic position of an electronic device carried by the user is periodically sampled and the resulting data points are processed to generate a list of popular locations that are correlated to movements of the particular user. As a result, the list of popular locations may be a compilation of points of interest that are associated with the particular user. The list of popular locations may serve as recommendations for various applications such as a task manager. In some examples, the popularity of a location may be based upon factors such as the frequency, duration of time, or the recency of the user's visits to the location. If a user prefers associating the location with a name or address rather than its geographic coordinates, reverse geocoding may be applied to the list of visited locations so that the address or name of the point of interest may be presented to the user. A system, method and non-transitory computer-readable media are disclosed which identify an individualized list of popularly visited locations for a specific user. Moreover, the system, method and non-transitory computer-readable media may utilize the individualized list in a task manager application as suggested locations where a desired task is to be performed. A brief introductory description of a basic general purpose system or computing device that can be employed to practice the concepts is illustrated in FIG. 1. A more detailed description of how the list of popular locations, also known as a visited locations list, will follow. Several variations shall be discussed herein as the various embodiments are set forth. The disclosure now turns to FIG. 1.

With reference to FIG. 1, an exemplary system 100 includes a general-purpose computing device 100, including a processing unit (CPU or processor) 120 and a system bus 110 that couples various system components including the system memory 130 such as read only memory (ROM) 140 and random access memory (RAM) 150 to the processor 120. The system 100 can include a cache 122 of high-speed memory connected directly with, in close proximity to, or integrated as part of the processor 120. The system 100 copies data from the memory 130 and/or the storage device 160 to the cache 122 for quick access by the processor 120. In this way, the cache provides a performance boost that avoids processor 120 delays while waiting for data. These and other modules can control or be configured to control the processor 120 to perform various actions. Other system memory 130 may be available for use as well. The memory 130 can include multiple different types of memory with different performance characteristics. It can be appreciated that the disclosure may operate on a computing device 100 with more than one processor 120 or on a group or cluster of computing devices networked together to provide greater processing capability. The processor 120 can include any general purpose processor and a hardware module or software module, such as module 1 162, module 2 164, and module 3 166 stored in storage device 160, configured to control the processor 120 as well as a special-purpose processor where software instructions are incorporated into the actual processor design. The processor 120 may essentially be a completely self-contained computing system, containing multiple cores or processors, a bus, memory controller, cache, etc. A multi-core processor may be symmetric or asymmetric.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices 160 such as a hard disk drive, a magnetic disk drive, an optical disk drive, tape drive or the like. The storage device 160 can include software modules 162, 164, 166 for controlling the processor 120.

Other hardware or software modules are contemplated. The storage device 160 is connected to the system bus 110 by a drive interface. The drives and the associated computer readable storage media provide nonvolatile storage of computer readable instructions, data structures, program modules and other data for the computing device 100. In one aspect, a hardware module that performs a particular function includes the software component stored in a non-transitory computer-readable medium in connection with the necessary hardware components, such as the processor 120, bus 110, display 170, and so forth, to carry out the function. The basic components are known to those of skill in the art and appropriate variations are contemplated depending on the type of device, such as whether the device 100 is a small, handheld computing device, a desktop computer, or a computer server.

Although the exemplary embodiment described herein employs the hard disk 160, it should be appreciated by those skilled in the art that other types of computer readable media which can store data that are accessible by a computer, such as magnetic cassettes, flash memory cards, digital versatile disks, cartridges, random access memories (RAMs) 150, read only memory (ROM) 140, a cable or wireless signal containing a bit stream and the like, may also be used in the exemplary operating environment. Non-transitory computer-readable storage media expressly exclude media such as energy, carrier signals, electromagnetic waves, and signals per se.

To enable user interaction with the computing device 100, an input device 190 represents any number of input mechanisms, such as a microphone for speech, a touch-sensitive screen for gesture or graphical input, keyboard, mouse, motion input, speech and so forth. An output device 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment is presented as including individual functional blocks including functional blocks labeled as a "processor" or processor 120. The functions these blocks represent may be provided through the use of either shared or dedicated hardware including, but not limited to, hardware capable of executing software and hardware (such as a processor 120) that is purpose-built to operate as an equivalent to software executing on a general purpose processor. For example the functions of one or more processors presented in FIG. 1 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 140 for storing software performing the operations discussed below, and random access memory (RAM) 150 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 100 shown in FIG. 1 can practice all or part of the recited methods, can be a part of the recited systems, and/or can operate according to instructions in the recited non-transitory computer-readable storage media. Such logical operations can be implemented as modules configured to control the processor 120 to perform particular functions according to the programming of the module. For example, FIG. 1 illustrates three modules Mod1 162, Mod2 164 and Mod3 166 which are modules configured to control the processor 120. These modules may be stored on the storage device 160 and loaded into RAM 150 or memory 130 at runtime or may be stored as would be known in the art in other computer-readable memory locations.

Having disclosed some components of a computing system, the disclosure now returns to a discussion of generating and updating a visited locations list associated with a portable device such as a smart phone, mobile phone or tablet PC. The approaches set forth herein can improve the efficiency and performance of an application such as a task manager by automatically providing a list of suggested (i.e., recommended) locations where a task may be performed. The suggestions are tailored for a particular user since the suggestions are based upon locations where the particular user has visited or frequently visits. These suggested locations can be utilized by various location-based services to serve as a "virtual passport" of locations where the particular user has been or enjoys going to.

Devices operating according to this disclosure include a heuristic analysis engine. The heuristic analysis engine may determine and track the destinations of a portable device by applying heuristics to a series of periodically sampled data points describing the position and velocity of the portable device. The destinations, also known as visited locations, may be correlated to generate statistics such as most frequently visited locations or locations where the most time is spent. The analysis engine may include a cache to store the sampled data points for computations or analysis that involve evaluating a series of data points over a period of distance or time. The results may be stored in a visited locations database or list, which may be accessible to other applications on the portable device through a general Application Protocol Interface (API).

Figure 2:
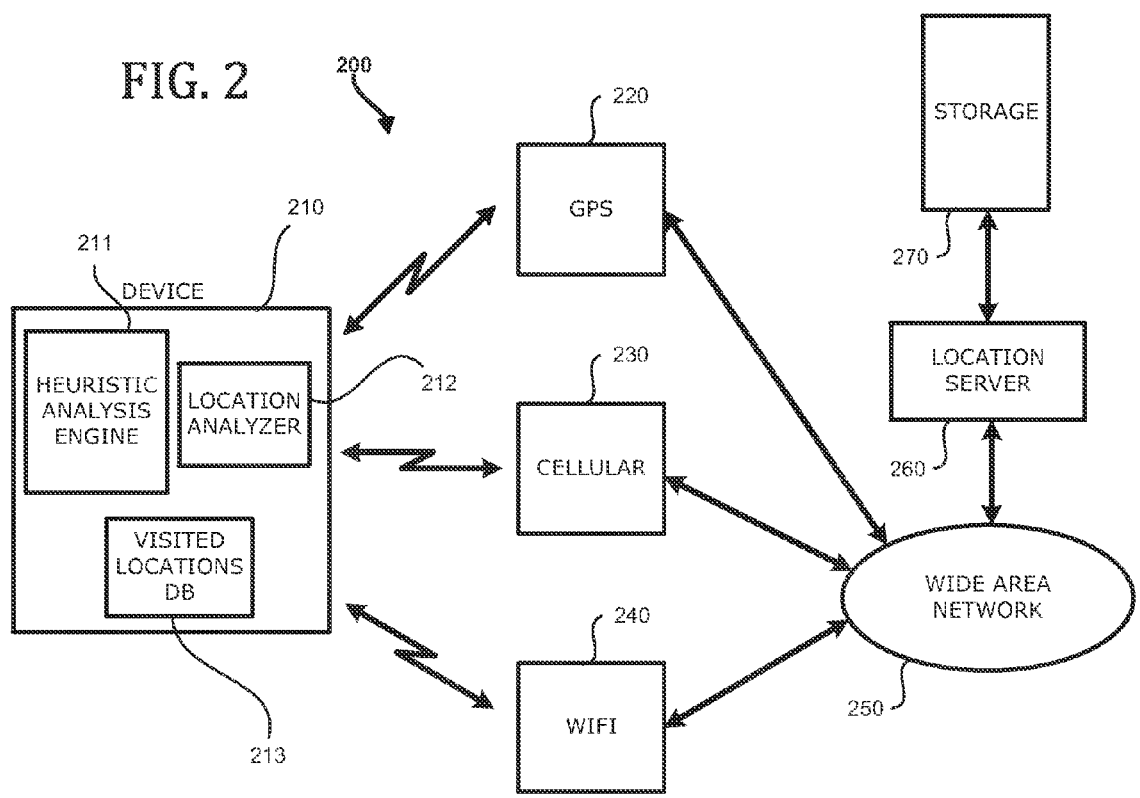
FIG. 2 illustrates an exemplary location determination system.

FIG. 2 illustrates an exemplary location determination system. In this example, system 200 includes electronic device 210, GPS network 220, cellular network 230, WiFi network 240, wide area network 250, location server 260, and storage 270. Electronic device 210 may be any device capable of wirelessly communicating with a positioning system 220, 230, 240 capable of determining the electronic device's geographic position. A geographic position describes a dynamic point on the globe that is associated with an object. In other words, the geographic position will change as the object moves. Examples of a moving object include a person, a vehicle, or a portable electronic device. In contrast, a geographic location describes a static point on the globe that is associated with a fixed object. Examples of a fixed object include a home, business, or other establishment. Electronic device 210 may be a variety of portable devices including a handheld portable computer, a personal digital assistant, a mobile phone, a smart phone, a camera, a tablet PC, a media play, a navigation device, a game console, any combination of the above, and others. Exemplary positioning systems include GPS network 220, cellular network 230, WiFi network 240, and other systems capable of providing the actual or estimated location of an electronic device.

Electronic device 210 can be wirelessly connected to GPS network 220, cellular network 230, and WiFi network 240. Through periodic communication with one or more of these positioning systems, electronic device 210 may continuously receive periodic updates on the position of electronic device 210. In some examples, the periodic updates may be received at a regular interval or rate. Electronic device 210 may generate and transmit a request for a status update on its position at a particular point in time to GPS network 220, cellular network 230, or WiFi network 240. Since the various positioning systems may operate on different protocols, the procedure for generating and transmitting a request may be dependent upon the network processing the request. For example if the request is to be processed by cellular network 230, device 210 transmits a roaming signal to one or more cellular towers of cellular network 230. Cellular network 230 in turn processes the roaming signal and through GSM localization, computes an estimated geographic position of device 210. In some examples, the strength of the roaming signal may affect accuracy of the estimated geographic position. The estimated geographic position may be in a variety of commonly known coordinate formats. For example, the estimated geographic position may be represented as longitude, latitude and altitude. As another example, the estimated geographic position may be represented as degrees, minutes, and seconds.

Once the estimated geographic position has been computed, cellular network 230 may transmit location information through cellular towers of cellular network 230 to device 210. In some examples, the location information may include the estimated geographic position, a timestamp of the particular point in time when the request was generated, an accuracy value associated with the accuracy of the estimated geographic position, a velocity associated with the speed (i.e., velocity) electronic device 210 was traveling when the request was generated, and/or other metadata related to the movements, position, or trajectory of electronic device 210 at the time or substantially near the time the request was generated. This location information may be presented as a data point, which is a format that is understood by electronic device 210, GPS network 220, cellular network 230, WiFi network 240, and possibly other blocks of system 200. The format provides a convenient and efficient means for communicating the location information through different components of system 200. In other examples, requests for data points may alternatively be transmitted to GPS network 220 or WiFi network 240. These alternatives improve the likelihood that at least one positioning system will be available to fulfill a request submitted by electronic device 210 at a particular point in time. As discussed above, requests to GPS network 220 and WiFi network 230 may be processed differently than a request transmitted to cellular network 230.

In this example, electronic device 210 automatically generates and transmits requests to the positioning systems at a pre-defined interval (i.e., periodic sampling), which may be user-specified. However, the requests may also be manually submitted. The rate in which the requests are automatically generated and transmitted may be based upon a user-specified frequency that is time-dependent, distance-dependent, or other variant. Periodic sampling is discussed in more detail in below. Alternatively, the positioning systems may be configured to periodically transmit a request to electronic device 210 requesting the necessary information to compute an estimated geographic position for electronic device 210. Through continuous periodic sampling of the position of electronic device 210, which may be requested by electronic device 210, GPS network 220, cellular network 230, or WiFi network 240, a series of data points are generated that describe the movements of electronic device 210 as a function of time. The series of data points may be received by electronic device 210 for analysis. The analysis may determine the locations electronic device 210 has traveled to during a period of time (e.g., a day, a week, a month, a year, or other user-specified period of time) and/or the duration electronic device 210 has spent in each location. If a user has been carrying electronic device 210 during that period of time, this analysis may also be applicable to the particular user. In essence, the series of data points generated from the continuous periodic sampling provide an organized collection of data describing the path of electronic device 210. This collection of data is used for various purposes, including automatically determining a series of passageways and destinations of electronic device 210 or automatically identifying the locations or locale most popular (according to most recently visited, most frequently visited, most time spent, etc.) to the user carrying the electronic device, to name a few.

Device 210 includes heuristic analysis engine 211, location analyzer 212, and visited locations database 213. Heuristic analysis engine 211 is configured to analyze data points received by device 210. In some examples, heuristic analysis engine 211 originates the requests for the data points. In other examples, another component of electronic device 210 or other parts of system 200 (such as GPS network 220, cellular network 230, WiFi network 240, or location server 260) originates the requests. A series of data points are received in response to the periodic requests and transmitted to heuristic analysis engine 211 for analysis, where a determination is made as to whether a particular data point received represents a transient passage (i.e., passageway) or a destination. A transient passage is a temporary passing of a location that is on the path to the user's destination. For example, a transient passage may be a park or restaurant that the user passes on his way to his destination and does not wish to visit. However, due to the continuous periodic nature in which requests are transmitted, a data point for the park or restaurant was received. As another example, a transient passage may be locations that the user involuntarily stops at while driving or walking due to traffic or traffic lights. In contrast, a destination is a location that the user wishes to visit. A destination may be any point of interest, such as a movie theater, shopping mall, supermarket, or other location that the user voluntarily stops at. For example, if the user wishes or intends to visit the park and restaurant above, then those locations would be considered destinations rather than transient passages. By differentiating whether a data point represents a transient passage or a destination, system 200 may separate or distinguish the data points which are irrelevant (i.e., transient passage) from the data points which provide relevant information relating to the user's unique preferences (i.e. destination). The relevant information may subsequently be used to automatically generate, manage, and update a list of locations that are frequently visited by the user. Exemplary algorithms that may be performed by heuristic analysis engine 211 are discussed in more detail below.

Device 210 also includes location analyzer 212. Location analyzer 212 is configured to manage and update a visited locations list. The visited locations list contains a plurality of entries, where each entry is associated with a location that electronic device 210 has previously visited. In other words, visited locations list stores information relating to previous destinations of electronic device 210 and by inference, the previous destinations of the user of electronic device 210.

Visited locations list is a dynamic list that updates as the user of electronic device 210 visits locations and destinations, new or previously visited.

For example, a new entry may be generated in visited locations list to represent a new location in the list when the user visits a restaurant or other establishment for the first time.

Visited locations list may also be a sorted list that is fixed in size. For example, an entry associated with a coffee shop that the user frequents while on vacation may be ranked high on the list during vacation but then be removed from the list a short period of time after the user returns from vacation because the user no longer visits that coffee shop. Similarly, the visited locations list of a user who recently started a new job may include an entry of the user's new office. After a few days, the entry associated with the user's office may be highly ranked in the visited locations list as one of the places the user visits most often. In this example, the visited locations list is stored within visited locations database 213 but in other examples, the visited locations list may be stored in any type of computer readable media which can store data accessible by a processor, such as magnetic cassettes, flash memory cards, digital versatile disks, cartridges, random access memories (RAMs) 150, read only memory (ROM) 140, a cable or wireless signal containing a bit stream and the like. For example, the visited locations list may be stored in any of the blocks of system 200 to be received by electronic device 210 when requested.

Location analyzer 212 manages and updates the visited locations list by correlating the visited locations in the list with the user's recently visited locations. For example, if a recently visited location is not associated with a location in the visited locations list, location analyzer 212 may add a new entry for the recently visited location. Alternatively if the recently visited location is correlated with a location in the list, location analyzer 212 may increase the popularity of the entry associated with that location. In some examples, the popularity of the entry may be depend upon how frequently the user visits the location, how recently the user visited the location, and/or how long the user has spent visiting the location. By constantly updating the visited locations list to take into account the locations the user of electronic device 210 visits, location analyzer 212 maintains and updates a visited locations list to provide an accurate representation or portrayal of locations that the user likes to visit. Various applications of electronic device 210 such as a task manager can use the visited locations list as suggested locations for the user. Exemplary methods that may be used to update the visited locations list are described below.

In some examples, heuristic analysis engine 211, location analyzer 212, and visited locations database 213 are located elsewhere in system 200 to free the resources of device 210.

For example, an electronic device having minimal computing power (due to selection of components or limitations in size) may rely upon system 200 to support these applications. For example, GPS network 220, cellular network 230, and WiFi network 240 may route the data points through one or more communication links and through wide area network 250 to location server 260 instead of routing the data points to electronic device 210. Location server 260 may be configured to perform the functionality of heuristic analysis engine 211, location analyzer 212, and visited locations database 213 to maintain the visited locations list. When requested by electronic device 210, the visited locations list may be transmitted via GPS network 220, cellular network 230, or WiFi network 240 to electronic device 210.

The visited locations list can be provided to an application of electronic device 210 as a list of locations popular to the user of electronic device 210. Depending upon the application, the visited locations list may be provided to the application via an application protocol interface as a list of geographic locations having longitude, latitude, and sometimes altitude. In some applications where a name or address associated with the geographic locations is preferred, electronic device 210 transmits the visited locations list to a reverse geocoding service to translate the geographic locations into an address, or a name of the point of interest located at the geographic location. For example, electronic device 210 transmits the visited locations list wirelessly through GPS network 220, cellular network 230, or WiFi network 240 to wide area network 250, which in turn transmits the visited locations list to location server 260. Location server 260 accesses storage 270 to determine the names and/or addresses associated with each geographic location in the visited locations list through a reverse geocoding lookup service. The names and/or addresses associated with each geographical location in the visited locations list are then transmitted back across similar communication channels until they are received by device 210. This information may then be shared with other applications in electronic device 210 through an application protocol interface.

Figure 3:
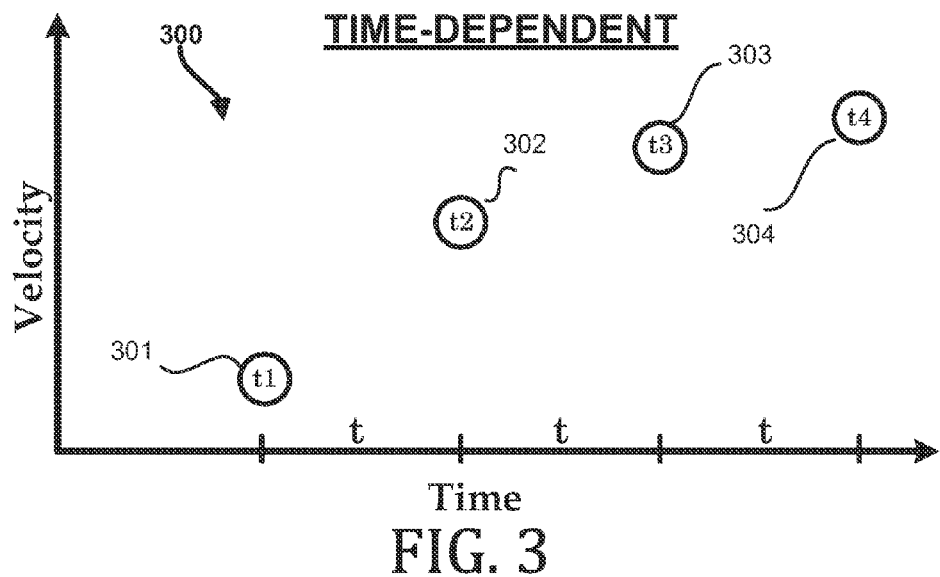
FIG. 3 illustrates an example of time-dependent periodic sampling.
Figure 4:
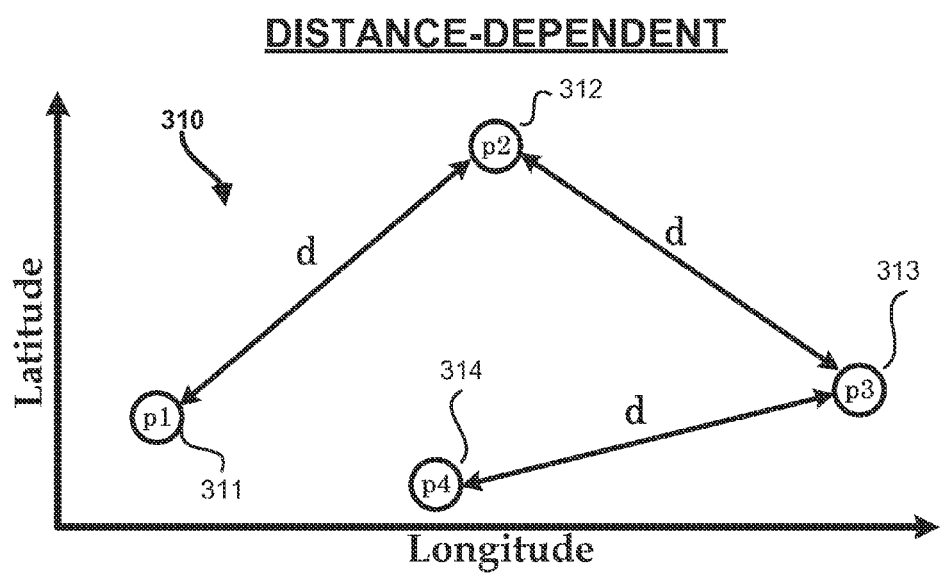
FIG. 4 illustrates an example of distance-dependent periodic sampling.

FIGS. 3 and 4 illustrate two exemplary types of periodic sampling. These examples of periodic sampling may be applied in system 200 of FIG. 2 to adjust the frequency that data points are generated and received. This is also known as the sampling rate. As shown in FIG. 3, time-dependent periodic sampling 300 generates samples (i.e., data points) based upon a specified time interval. The time interval between samples may be maintained by a clock signal of the device being sampled. Data point 301 provides location information about the device at time t1, data point 302 provides location information describing the device at time t2 (i.e., t1 plus time interval "t"), data point 303 provides location information describing the device at time t3 (i.e., t2 plus time interval "t"), and data point 304 provides location information describing the device at time t4 (i.e., t3 plus time interval "t"). Data points 301 to 304 may represent a user speeding up in a car since the velocity value associated with the data points increase over time.

FIG. 4 illustrates an example of distance-dependent periodic sampling. Similar to FIG. 3, distance-dependent periodic sampling 310 is also based upon sampling the position of the device depending upon an interval. However, the interval in distance-dependent sampling 310 is based upon a measure of distance between samples rather than a measure of time. Typically, the distance interval between samples is maintained by a distance measuring instrument of the device such as an odometer or a pedometer. However in some instances, the distance interval may be maintained using other means. As an example of maintaining the distance interval without the use of a distance measuring device, an algorithm may be implemented that periodically receives samples. The distance between a received sample and a sample that has already been processed is determined. If a distance threshold defined by the distance interval is not met, the received sample is discarded and the algorithm calls/requests a next sample. If the distance interval is met, the received sample is kept and processed. Here, data point 311 provides location information about the device at position p1, data point 312 provides location information describing the device at position p2 (i.e., p1 plus distance interval "d"), data point 313 provides location information describing the device at position p3 (i.e., p2 plus distance interval "d"), and data point 304 provides location information describing the device at position p4 (i.e., p3 plus distance interval "d").

The time interval "t" and distance interval "d" may be pre-defined or defined by a user through a user interface of the device being sampled. In some examples, the time interval or distance interval depends upon the resources of the device being sampled and/or the resources of the sample-generating device. For example, the processing power available in an electronic device for automatically updating a visited locations list may be limited and can only support a large interval. In other examples, the interval chosen may depend upon the precision or accuracy of the results desired. For example, an application tracking movements of the device being sampled may require a shorter interval than an application tracking the visited locations of the device. As an example, an application tracking visited locations of a device may utilize a time interval that is based upon the minimum amount of time the device must remain at a given location before the location is considered a destination of the device.

Figure 5:
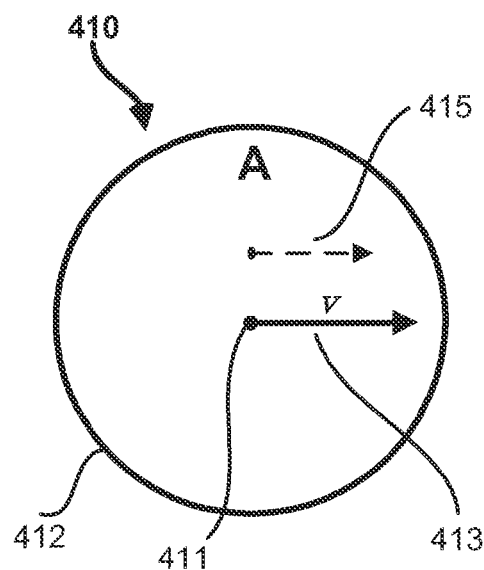
FIG. 5 illustrates an example of analyzing location information.
Figure 6:
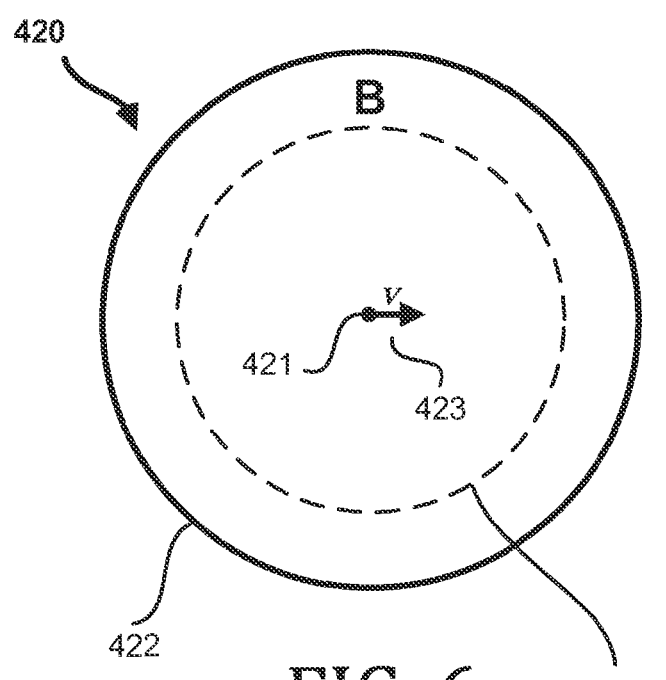
FIG. 6 illustrates an example of analyzing location information.
Figure 7:
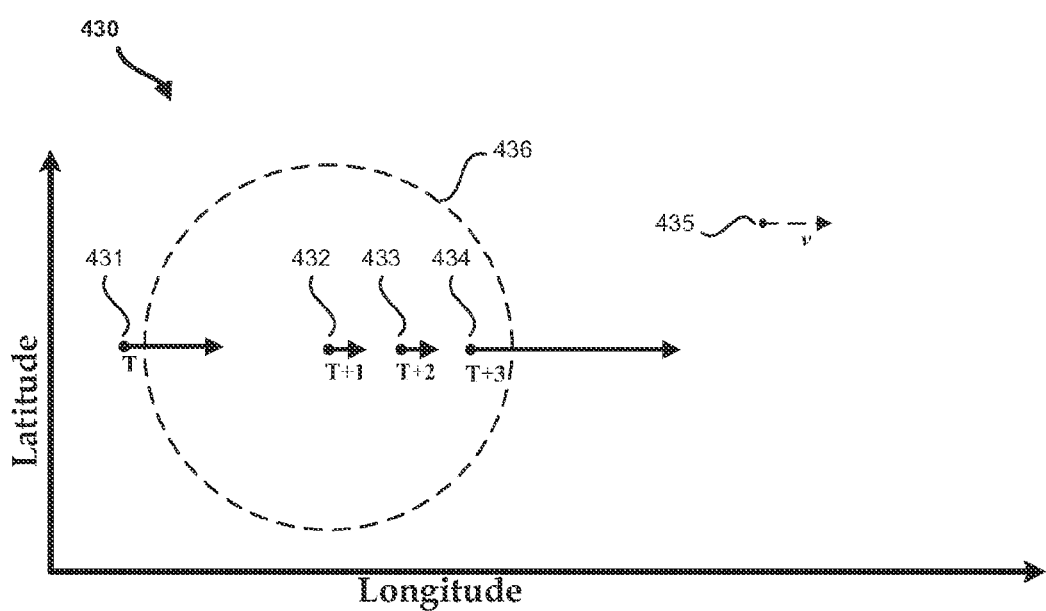
FIG. 7 illustrates another example of analyzing location information.

FIGS. 5 to 7 illustrate examples of analyzing location information that may be performed by a heuristic analysis engine to determine whether a given data point is a destination or transient passage. One or more of the algorithms described in these examples may receive a data point and provide an output or determination based upon the input. The heuristic analysis engine can also be used to determine whether a given data point is a destination or transient passage. These algorithms are described only for illustrative purposes and it will be apparent to one of ordinary skill that other algorithms can be used including algorithms that incorporate the teachings disclosed herein.

FIG. 5 illustrates an example of analyzing location information. Algorithm 410 determines whether data points are transient passages by analyzing a velocity value associated with the data points. Data points having a high velocity value do not represent a destination since a user moving at high speed has not reached his destination. Data points with a velocity value larger than a velocity threshold are identified by the algorithm 410 as transient passage data points. For example, data points generated from requests while a user is at a supermarket buying groceries will have a slow speed (i.e., velocity) or no speed as the user travels up and down the aisles. These data points are considered relevant in determining the frequency, recency, total time spent, and other statistics related to the user's interaction with this specific destination. In comparison, data points generated from requests while the user is driving to the supermarket will have a higher speed. These data points are ignored since they represent transient passages. As shown here, data point "A" includes geographic position 411, accuracy value 412, and velocity value 413. Algorithm 410 compares velocity value 413 with velocity threshold 415 to determine whether data point "A" is a transient passage. In some examples, the velocity threshold is based upon the user's maximum walking speed, which may be between three to six miles per hour. In other examples, the velocity threshold is based upon other user criteria.

FIG. 6 illustrates another example of analyzing location information. Algorithm 420 determines the reliability (i.e., accuracy) of a data point's location information by analyzing an accuracy value associated with the data point. The accuracy value associated with the data point is provided by the positional system as a means of tracking the reliability of the location information. The reliability of the location information may vary between data points because of external factors and considerations that come from generating samples in wide range of locations. Factors that affect the accuracy of the location information generated such as, the signal strength of the positioning system and obstructions between the device and the positioning system vary greatly from location to location. For example, a cellular network may generate a data point with a low accuracy value in the countryside because of few cellular towers in that particular area. As another example, a cellular network may generate a data point with a low accuracy value when the request is made in an area heavily populated with large buildings. As yet another example, a cellular network may generate a data point with a high accuracy value when the request is made in an open area with many cellular towers. As shown in FIG. 6, data point "B" includes geographic position 421, accuracy value 422, and velocity value 423. Accuracy value 422 is illustrated by a circle. A data point with a low accuracy value is illustrated as a circle with a large radius representing a range within which the actual geographic position of the data point (versus the estimated or measured geographic position) exists. Similarly, a data point with a high accuracy value is represented as a circle with a small radius. Algorithm 420 compares accuracy value 422 with accuracy threshold 425 to determine whether the data point is accurate enough for further analysis. If the data point is not accurate enough, the data point is considered a transient passage and in some instances discarded. In some examples, the accuracy threshold is based upon an area that is representative of a typical point of interest. For example, the accuracy threshold may be based upon the square footage of one or more locations visited by the user or the average size of a residence or establishment.

FIG. 7 illustrates another example of analyzing location information. Algorithm 430 determines whether a selected data point is a transient passage or a destination by analyzing the selected data point and other data points that were requested within a time frame or distance of the selected data point. The time frame or distance, which may be predefined or user-specified, is used to identify one or more data points generated before, after, or before and after the selected data point. Together, the selected data point and the one or more data points are analyzed by algorithm 430 to make the determination. By analyzing a combination of data points that are relatively close in time or distance, algorithm 430 may determine whether the user of the device has remained within a proximity of the geographic location associated with the selected data point for a sufficient period of time to represent a visitation of a point of interest located at that geographic location. This prevents involuntary stops from being considered a user destination. In some examples, the sufficient period of time is predetermined by the user.

Referring to FIG. 7, the device is moving east bound in a straight line with varying velocity. The series of generated data points 431-434 may represent a car at a traffic light. Algorithm 430 iteratively selects each data point from the series of data points 431-434. For each selected data point, algorithm 430 first compares the velocity value associated with the selected data point with a predefined velocity threshold 435 to determine whether the data point represents a transient passage. This comparison is described in more detail above in the description of FIG. 5.

Referring to FIG. 7, after data points 431 and 434 are considered transient passages they are no longer analyzed by algorithm 430. Data points with a velocity value less than the velocity threshold (i.e., data points 432 and 433) are further analyzed by retrieving one or more additional data points from the series of data points based upon a distance threshold or time threshold (not shown). The additional data points are analyzed to determine whether the device has remained within a proximity of the geographic position associated with the selected data point for a predetermined period of time. As an example, the analysis may include comparing the timestamp and the geographic position of the additional data points again each other or against specified thresholds. As another example, the analysis may include comparing the velocity value and the geographical position of the additional data points against each other or against specified thresholds. Algorithm 430 can retrieve additional data points 433 and 434 based upon a time threshold during the analysis of data point 432. The geographical position of the three data points is analyzed to determine whether the points lie within distance threshold 436. Since all data points lie within distance threshold 436, algorithm 430 determines that data point 432 represents a user destination. In other examples, algorithm 430 may be modified to evaluate other location information of the data point.

Figure 8:
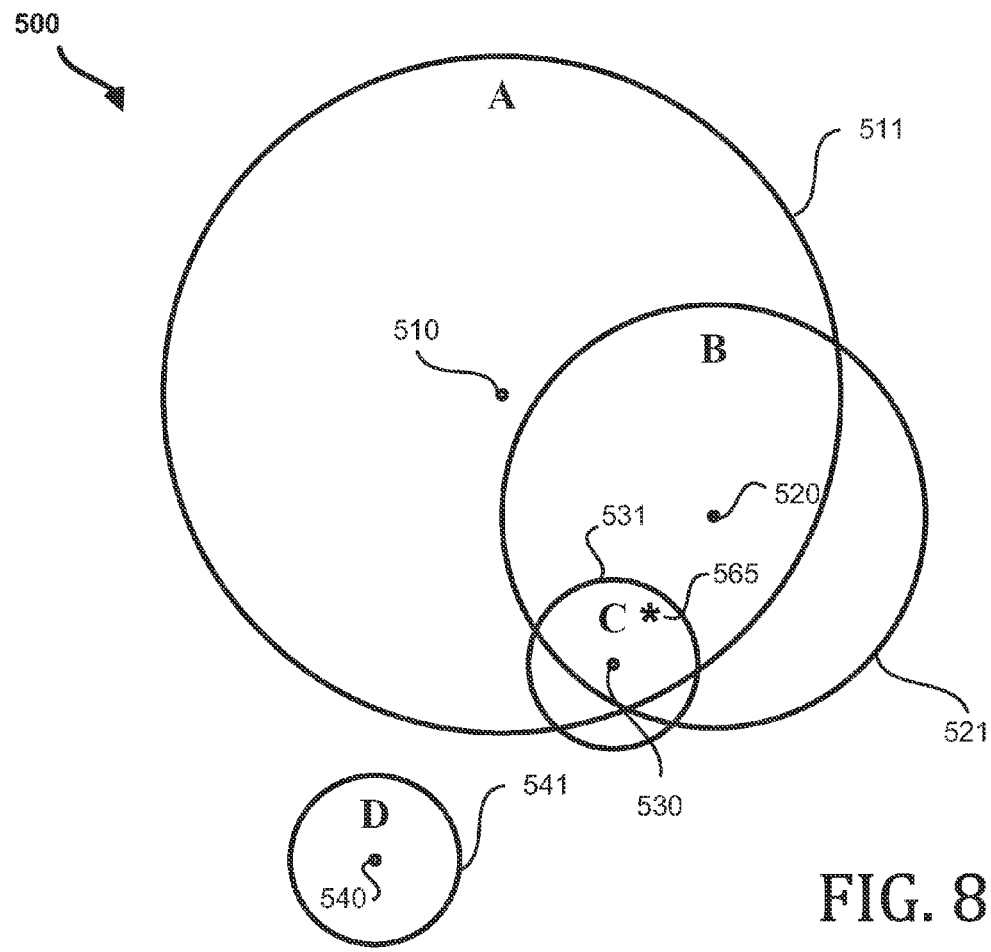
FIG. 8 illustrates an example of generating and updating a visited locations list.

FIG. 8 illustrates an example of generating and updating a visited locations list. Algorithm 500 generates and updates entries in visited locations list 590 by correlating data points stored in visited locations list 590 with data points that are indentified [sic] as destination based data points in a heuristic analysis. The data points that are correlated with visited locations list 590 may be processed iteratively in accordance to their respective timestamps. For example, the data points can be processed in the following order: data point 510, data point 520, data point 530, followed by data point 540. All the data points can also be processed by mapping all the geographic locations of the data points onto a graph and simultaneously correlating them. Algorithm 500 correlates the data points according to a variety of methods. Three exemplary methods are described below.

Referring to FIG. 8, algorithm 500 can correlate the data points according to a radius of the data points. The radius may be related to an accuracy value associated with the data points as described above. As an example, radius 511 can be a circle with a radius equal to the accuracy value of data point 510. As another example, radius 511 can be a circle with a radius equal to a value generated by combining the accuracy value of point 510 with a modifier or multiplier. The modifier (or multiplier) can be a value set by the user to specify the level of correlation the user wishes to have in his personalized visited locations list. Alternatively, the modifier can be based upon other metadata associated with the data point, such as the velocity value. Initially, visited locations list 590 is empty. Algorithm 500 processes data point 510 by correlating the radius of data point 510 with the radius of the data points stored in visited locations list 590. Since visited locations list 590 is initially empty, no correlation exists. Thus, algorithm 500 generates a new entry for storing metadata associated with data point 510. Next, algorithm 500 processes data point 520 in a similar manner as data point 510. This involves comparing one radius 511 of data point 510 with another radius 521 of data point 520 to determine if the radii overlap. Since the two radii do overlap in this instance, algorithm 500 updates the entry in visited locations list 590 associated with data point 510 so that both data points are represented in one entry of visited locations list 590. As an example, data points 510 and 520 may be merged or combined by storing the metadata of the data point having a smaller radius. The data point having a smaller radius is stored based upon the presumption that a smaller radius represents more accurate location information that improves the accuracy of visited locations list 590. Different metadata not originally part of the data point may also be generated and stored as part of the entry. For example, count metadata can be created to store a count value configured to track the number of times the user has visited a location. The count value is updated as data points are merged in visited locations list 590. Count metadata can also be combined with other metadata to generate new metadata such as a frequency value describing how often the user of the device visits a location in a given period of time. Other metadata added to the entry can include a total time spent at a geographic location, a timestamp of the last visit to the geographic location, points of interest located at the geographic location, and others. Next, algorithm 500 processes data points 530 and 540 in a similar manner. More particularly, radius 541 of data point 540 does not overlap with radius 531 of data point 530 and therefore, new entry is generated in visited locations list 590 to store the location information of data point 530. After processing the four data points, visited locations list 590 includes two entries. As described above in reference to FIG. 8, a data point stored in an entry of a visited locations list may be correlated with another data point based upon the radius of the two data points. In some examples, correlation of multiple data points can involve synthesizing the metadata of the two or more data points. For example, the geographic position of a data point stored in an entry of the visited locations list can be refined based upon the other data points being correlated, thus generating a new geographic position to be stored in the visited locations list. This new geographic position can be a weighted sampling of the contributing data points by taking into consideration their metadata such as geographic position, accuracy value, velocity value, and/or timestamp. In this instance, geographic position 565, which is a new geographic position generated from the weighted sampling of data points 510, 520 and 530, is associated with data point 530 in visited locations list 590.

Figure 9:
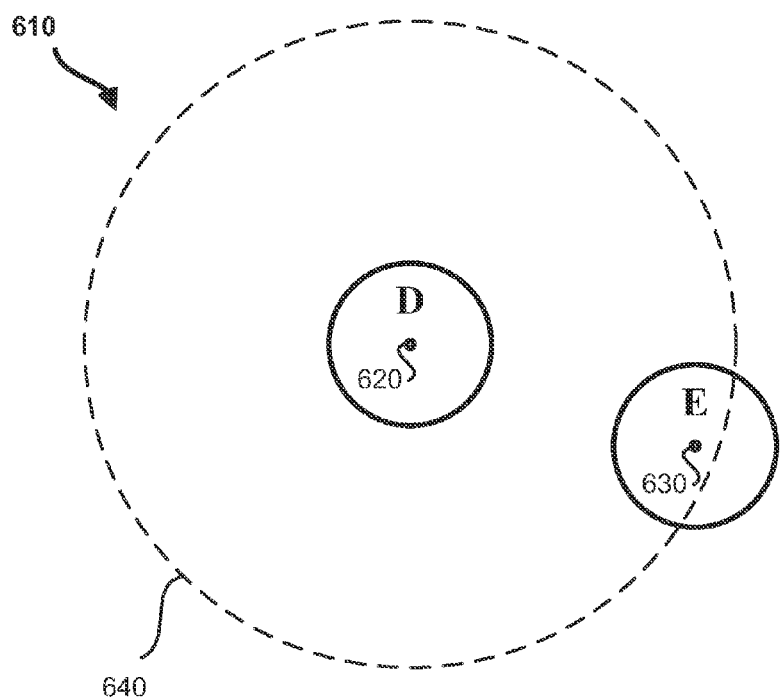
FIG. 9 illustrates an exemplary method of correlating data points.

FIG. 9 illustrates another exemplary method for correlating data points that does not depend upon the radius of the data points. In some examples, this exemplary method may be combined with algorithm 500 of FIG. 8 to further correlate the data points. Algorithm 610 combines data points if the geographic positions of the data points are within a correlation distance threshold of one another. In other words, data points are correlated if the data points are both located within radius 640 generated by the correlation distance threshold. The radius may originate from the location of an entry stored in the visited locations list or alternatively, the location of a data point that is attempting to be correlated with the entries of the visited locations list. Data point 620 and data point 630 are correlated even though their radii do not overlap. The correlation distance threshold may provide a means of combining multiple data points simultaneously by evaluating the geographic position of multiple data points at the same time.

Figure 10:
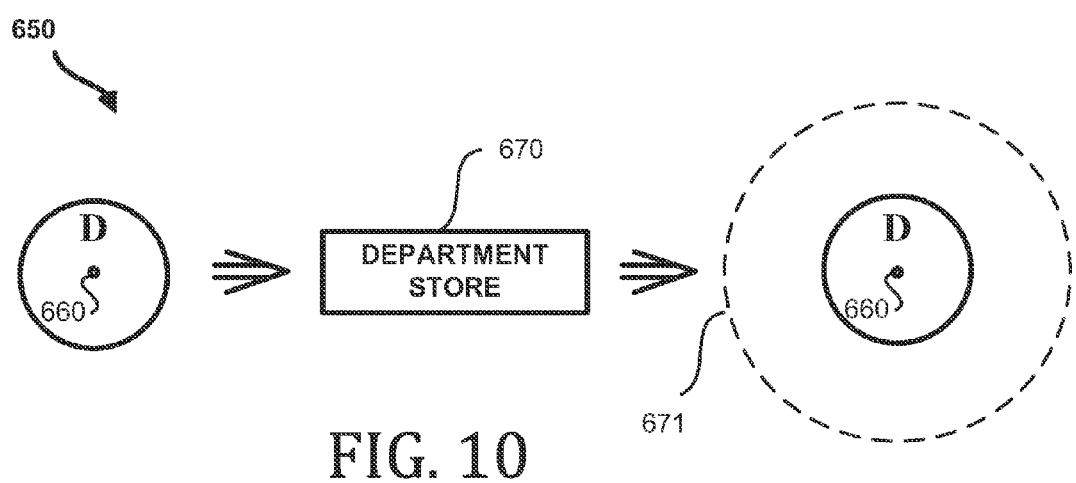
FIG. 10 illustrates another exemplary method of correlating data points.

FIG. 10 illustrates another exemplary method for correlating data points. Algorithm 650 generates the correlation distance threshold, which is used in algorithm 610 of FIG. 9, by performing a reverse geocoding lookup of the data points stored in entries of the visited locations list. In this example, data point 660 is associated with an entry in the visited locations list. Algorithm 650 requests a reverse geocoding service to perform a reverse lookup for the establishment, residence, or other point of interest located as the geographic location of data point 660. The request may be for the physical dimensions of the point of interest. Here, the reverse geocoding service responds to the request and notifies algorithm 650 that the point of interest is department store 670 having physical dimensions 671. Algorithm 650 receives physical dimensions 671 and translates the dimensions into a correlation distance threshold that may be used to correlate the data point with other data points. By increasing the correlation distance threshold to the physical dimensions of the point of interest, all data points that are located within department store 670 may be stored in a single entry of the visited locations list. This provides a more accurate and concise list of locations visited by the user.

Figure 11:
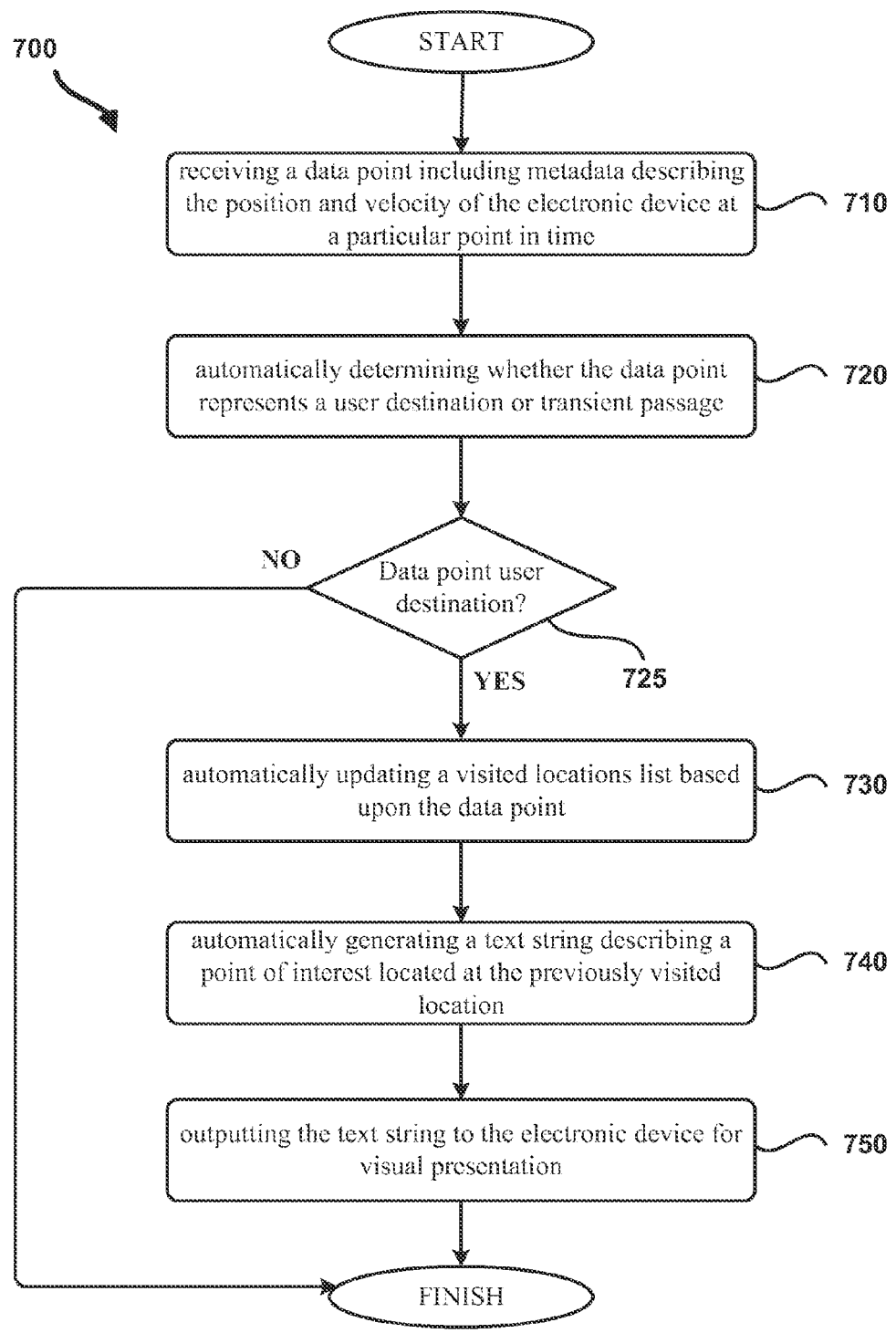
FIG. 11 illustrates an exemplary process for automatically updating a visited locations list.

FIG. 11 illustrates an exemplary process for automatically updating a visited locations list. As shown in FIG. 11, process 700 begins by receiving a data point including metadata describing the position and velocity of an electronic device at a particular point in time at step 710. The data point may have been requested by the electronic device at the particular point in time. Metadata associated with the data point may include a geographic position describing the location of the electronic device when the request was made, an accuracy value describing the accuracy of the metadata, a velocity value describing the speed of the electronic device when the request was made, a timestamp associated with a particular point in time, or other information related to the position and velocity of the electronic device at a point in time. The data point can belong to a series of data points generated from periodically sampling a position of the electronic device. The periodic sampling, which may be time-dependent or distance dependent, can be initiated by the electronic device or any other block illustrated in FIG. 2.

Once the data point has been received, process 700 continues by automatically determining whether the data point represents a destination of the electronic device or a transient passage at step 720. This determination may be based upon the metadata of the data point. The determination of whether the data point is a destination or a transient passage can be performed by a heuristic analysis engine as illustrated in FIG. 2. The determination may include comparing the accuracy value associated with the data point with a predefined accuracy threshold. The determination may also include comparing the velocity value associated with the data point with a predefined velocity threshold. The determination can also be based on other data points in a series of data points. For example, the determination may include retrieving one or more additional data points from the series of data points based upon the time stamp associated with the data point and a predefined time threshold. As another example, the determination may include retrieving one or more additional data points from the series of data points based upon the geographic position associated with the data point and a predefined distance threshold. The metadata of the additional data points may be evaluated and optionally compared with the metadata of the data point that was initially received to determine whether the data point represents a user destination. This evaluation may include evaluating the additional data points to determine whether the electronic device has remained within a proximity of the geographic position associated with the data point for a predetermined period of time.

If the data point is determined to not represent a user destination at step 725, process 700 ends. Alternatively if the data point is determined to represent a user destination, process 700 continues by automatically updating a visited locations list based upon the data point at step 730. As described above, the visited locations list includes entries storing metadata associated with previously visited locations of the electronic device. The data point may be combined with an existing entry when the position associated with the data point and an entry of the visited locations list are correlated. In some examples, correlation occurs when the distance between the position and a previously visited location are within a predefined correlation distance threshold. The correlation distance threshold may be predefined, user-defined, or even depend upon the characteristics of previously visited locations. As an example, the correlation distance threshold may be based upon a physical dimension describing a point of interest located at the previously visited location. For example, a previously visited location having a supermarket as a point of interest may have a correlation distance threshold that is based upon the physical dimensions of the supermarket.

After the visited locations list has been automatically updated, process 700 may continue by automatically generating a text string describing a point of interest located at a previously visited location stored in the visited locations list at step 740. This may be performed by utilizing a reverse geocoding service. If process 700 does not have the functionality of a reverse geocoding service, process 700 an automatic request may be generated and transmitted to a reverse geocoding service provider. A text string can be generated for all the previously visited locations associated with the visited locations list.

After the text string has been received or generated, process 700 may continue by outputting the text string to the electronic device for visual presentation at step 750. If more than one text string was generated in step 740, then additional text strings may also be visually presented. In one example, the text strings are presented to the user as a personalized list of the most popular or frequently visited locations by the user. After step 750, process 700 is finished.

Figure 12:
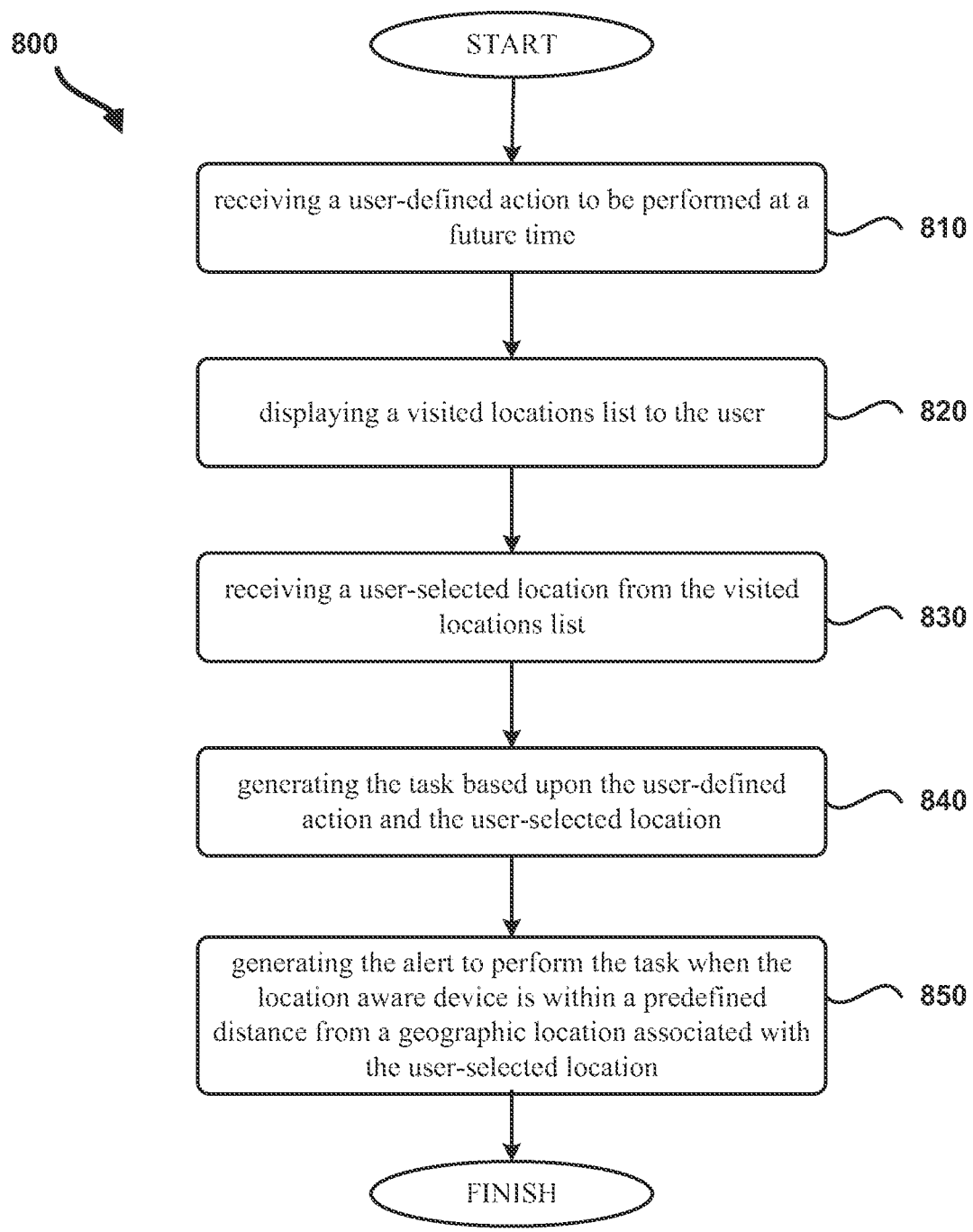
FIG. 12 illustrates an exemplary process for generating an alert to perform a task.

FIG. 12 illustrates an exemplary process for generating an alert to perform a task. As shown here, process 800 begins by receiving a user-defined action to be performed at a future time at step 810. This user-defined action may be a new task that the user is entering into a task manager on a mobile phone, PDA, tablet PC, media player, or other portable electronic device that is aware of its location. After the user-defined action is received, process 800 continues by presenting a visited locations list to the user at step 820. As an example, the visited locations list may be generated according to process 700 in FIG. 11 described above. The visited locations list may be presented to the user in visual or audio format and may include the name of a point of interest associated with the physical address or simply the physical address. The visited locations can be presented to the user as a sorted list by applying a variety of sorting algorithms including, but not limited to, most to least recently visited, most to least time spent, and nearest to furthest from user's current location. A user can select his or her desired sorting algorithm but if one is not selected, a default sorting algorithm, such as nearest to furthest from user's current location, may be applied. After the visited locations list is presented to the user, process 800 continues by receiving a user-selected location selected from the visited locations list at step 830. Process 800 then continues by generating a task that includes both the user-defined action and the user-selected location at step 840. After the task has been generated, process 800 waits until the device is within a predefined distance from a geographic location associated with the user-selected location. Once the device is within the predefined distance, process 800 generates an alert to perform the user-defined action at step 850. The alert may be audio, visual, or other sensory alert such as a vibration. The alert may be output to the user to notify the user to perform the user-defined action. The alert may also include other information related to the task, such as estimated time until arrival at the user-selected location, the estimated time of arrival at the user-selected location, the amount of time remaining to perform the task, how much time will be required to perform the task, and others. Once the alert has been generated, process 800 is finished.

In some examples, the task manager applies heuristics to the list of tasks and alerts the user of a task that needs to be performed based upon other factors than simply distance of the task to the user's current location. The task alerts can be sorted and generated based upon the amount of time remaining to perform the task, the location of the tasks themselves, and/or other variables associated with the tasks. For example, tasks that are associated with a general point of interest such as a supermarket can be combined with another task associated with a specific location so that they can be performed at the same time. For instance, a first task associated with picking up groceries at any supermarket and a second task associated with picking up dry cleaning at a specific a dry cleaner store located in a shopping center having a supermarket can be simultaneously presented to the user when the user is nearby the shopping center. In another example, the task manager may sort the to-do list with a task to pick up the dry cleaning at the dry cleaners in front of a task to pick up groceries at the grocery store, both of which are located in the same shopping center, because the dry cleaning needs to be picked up by Wednesday while the groceries have a due date of Friday. In some examples, the user tasks can be generated by a third party using a remote facility. For example, a dry cleaning service may send notifications to a user that the dry cleaning is completed and also generate a task that is to be populated to the user's electronic device. This remote facility may be coupled to the positional systems illustrated in system 200 of FIG. 2. In other examples, the task manager is capable of automatically scan email, SMS, and other data stored in the electronic device for tasks that are to be extracted and stored in the to-do list.

Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. For example, the principles herein can be applied to improve resilience to brute force attacks or similar attacks by limiting the speed at which such attacks are possible. Those skilled in the art will readily recognize various modifications and changes that may be made to the principles described herein without following the example embodiments and applications illustrated and described herein, and without departing from the spirit and scope of the disclosure.

What is claimed is:

1. A method comprising:
receiving, by one or more processors, a data point generated from sampling a geographic position of an electronic device, wherein the data point includes metadata describing a geographic position of the electronic device at a particular point in time;
determining, by the one or more processors, that the data point represents a destination of the electronic device based on the metadata of the data point;
identifying, by the one or more processors, a distance threshold corresponding to the data point;
accessing, by the one or more processors, a list of previously visited locations, each of the previously visited locations having been previously identified as a destination of the electronic device;
comparing, by the one or more processors, the geographic position associated with the data point to the previously visited locations;
identifying, by the one or more processors, a first previously visited location that is within the distance threshold of the geographic position associated with the data point; and
updating, by the one or more processors, an entry of the first previously visited location in the list based on the data point.

2. The method of claim 1, wherein updating the entry of the first previously visited location includes adding the geographic position associated with the data point to the entry, and wherein the geographic position associated with the data point is represented as geographic coordinates.

3. The method of claim 1, wherein updating the entry of the first previously visited location includes using the geographic position associated with the data point and a first position of the first previously visited location to determine a new position for the entry, and wherein each entry in the list of previously visited locations can be associated with one or more geographic positions.

4. The method of claim 1, wherein updating the entry of the first previously visited location includes:
- determining a first accuracy of a first position of the first previously visited location and a second accuracy associated with the geographic position associated with the data point;
- comparing the first accuracy and the second accuracy; and
- updating the entry to have the position that is more accurate.

5. The method of claim 1, wherein updating the entry of the first previously visited location includes updating a count value configured to track a number of time the electronic device has visited the first previously visited location.

6. The method of claim 1, wherein the distance threshold is based on a radius around a first position of the first previously visited location, and wherein the radius is dependent on an accuracy value for the first previously visited location.

7. The method of claim 6, wherein the radius is further dependent on a user-specified level or other metadata for the first previously visited location.

8. The method of claim 1, wherein the distance threshold is based upon a physical dimension describing a point of interest located at the first previously visited location.

9. The method of claim 1, wherein the metadata of the data point comprises a geographic position, an accuracy value, a velocity value, and a timestamp associated with the particular point in time.

10. The method of claim 9, wherein the distance threshold is based on a radius around the geographic position associated with the data point, and wherein the radius is dependent on at least one of: metadata of the data point and a user-specified level.

11. The method of claim 10, wherein the distance threshold is further based on a radius around a first position of the first previously visited location.

12. The method of claim 9, wherein determining that the data point represents a destination comprises comparing the accuracy value associated with the data point with a predefined accuracy threshold.

13. The method of claim 9, wherein determining that the data point represents a destination comprises:
- retrieving one or more additional data points from a series of data points based upon the time stamp associated with the data point and a predefined time threshold; and
- evaluating the metadata of the data point and the metadata of the one or more additional data points to determine that the data point represents the destination.

14. The method of claim 9, determining that the data point represents a destination comprises:
- retrieving one or more additional data points from a series of data points based upon the geographic position associated with the data point and a predefined distance; and
- evaluating the metadata of the data point and the metadata of the one or more additional data points to determine that the data point represents the destination.

15. A non-transitory computer readable storage medium storing instructions which, when executed by a computing device, cause the computing device to perform operations comprising:
- receiving a data point generated from sampling a geographic position of an electronic device, wherein the data point includes metadata describing a geographic position of the electronic device at a particular point in time;
- determining that the data point represents a destination of the electronic device based on the metadata of the data point;
- identifying a distance threshold corresponding to the data point;
- accessing a list of previously visited locations, each of the previously visited locations having been previously identified as a destination of the electronic device;
- comparing the geographic position associated with the data point to the previously visited locations;
- identifying a first previously visited location that is within the distance threshold of the geographic position associated with the data point; and
- updating an entry of the first previously visited location in the list based on the data point.

16. The non-transitory computer readable storage medium of claim 15, wherein updating the entry of the first previously visited location includes:
- determining a first accuracy of a first position of the first previously visited location and a second accuracy associated with the geographic position associated with the data point;
- comparing the first accuracy and the second accuracy; and
- updating the entry to have the position that is more accurate.

17. The non-transitory computer readable storage medium of claim 15, wherein the distance threshold is based on a radius around a first position of the first previously visited location, wherein the radius is dependent on an accuracy value for the first previously visited location, and wherein the radius is further dependent on a user-specified level or other metadata for the first previously visited location.

18. A system for identifying previously visited locations, the system comprising:
- a processor;
- a memory configured to store a list of previously visited locations, the list having a plurality of entries, wherein each entry is associated with a previously visited location of a portable device;
- a heuristic engine configured to sample a geographic position of the portable device according to steps comprising:
  - receiving a data point associated with a geographic position of the portable device, the data point including metadata describing the geographic position of the portable device at a point in time; and
  - determining whether the data point is a destination based upon the metadata;
- a location analyzer configured to:
  - identify a distance threshold corresponding to the data point;
  - access a list of previously visited locations, each of the previously visited locations having been previously identified as a destination of the portable device;
  - compare the geographic position associated with the data point to the previously visited locations;
  - identify a first previously visited location that is within the distance threshold of the geographic position associated with the data point; and
  - update an entry of the first previously visited location in the list based on the data point.

19. The system of claim 18, wherein updating the entry of the first previously visited location includes:
- determining a first accuracy of a first position of the first previously visited location and a second accuracy associated with the geographic position associated with the data point;
- comparing the first accuracy and the second accuracy; and
- updating the entry to have the position that is more accurate.

20. The system of claim 18, wherein the distance threshold is based on a radius around a first position of the first previously visited location, wherein the radius is dependent on an accuracy value for the first previously visited location, and wherein the radius is further dependent on a user-specified level or other metadata for the first previously visited location.

* * * * *